(12) United States Patent
Ternovsky (10) Patent No.: US 7,694,041 B2
(45) Date of Patent: Apr. 6, 2010

(54) METHOD FOR MANAGING BUFFERS POOL AND A SYSTEM USING THE METHOD

(75) Inventor: Igor Ternovsky, Mount Waverley (AU)

(73) Assignee: Arabella Software Ltd., San Diego, CA (US)

( * ) Notice: Subject to any disclaimer, the term of this patent is extended or adjusted under 35 U.S.C. 154(b) by 280 days.

(21) Appl. No.: 11/437,984

(22) Filed: May 19, 2006

(65) Prior Publication Data

US 2008/0005404 A1 Jan. 3, 2008

(51) Int. Cl.
*G06F 13/00* (2006.01)
(52) U.S. Cl. .............................. 710/52; 710/22; 710/33
(58) Field of Classification Search .................. 710/52; 711/147; 709/226; 370/412
See application file for complete search history.

(56) References Cited

U.S. PATENT DOCUMENTS

| | | | |
|---|---|---|---|
| 5,432,908 A | | 7/1995 | Heddes et al. |
| 5,619,675 A | * | 4/1997 | De Martine et al. ......... 711/133 |
| 5,682,553 A | | 10/1997 | Osborne |
| 6,026,443 A | * | 2/2000 | Oskouy et al. .............. 709/230 |
| 6,032,179 A | * | 2/2000 | Osborne ..................... 709/213 |
| 6,650,640 B1 | * | 11/2003 | Muller et al. ............... 370/392 |
| 6,826,634 B2 | * | 11/2004 | Nath .......................... 710/22 |
| 6,931,497 B2 | | 8/2005 | Clayton et al. |
| 7,111,092 B1 | * | 9/2006 | Mitten et al. ................ 710/52 |
| 7,461,183 B2 | * | 12/2008 | Ellis et al. ................... 710/35 |
| 2002/0176430 A1 | * | 11/2002 | Sangha et al. ............... 370/412 |
| 2003/0061332 A1 | * | 3/2003 | Narad et al. ................ 709/223 |
| 2005/0055406 A1 | * | 3/2005 | Singhai et al. .............. 709/206 |
| 2006/0236011 A1 | * | 10/2006 | Narad et al. ................ 710/240 |

OTHER PUBLICATIONS

Wendy Powley et al., "Autonomic Buffer Pool Configuration in PostgresSQL", School of Computing, Queen's University, Kingston, ON, Canada, pp. 1-6.
International Search Report for PCT/IB07/01300, mailed on Jul. 2, 2008.

* cited by examiner

*Primary Examiner*—Henry W. H. Tsai
*Assistant Examiner*—Cheng-Yuan Tseng
(74) *Attorney, Agent, or Firm*—Bruce W. Greenhaus (57) ABSTRACT

Method and system for managing a buffers pool. The system may include a first processor coupled to a general memory having allocation ring and de-allocation ring portions; and a second processor to perform internal accounting of pointer(s) buffer(s). The second processor has an internal storage array logically divided into first and second storage spaces. The second processor releases temporarily un-required buffer(s) pointer(s) to the first storage space, or to the second storage space if the first storage space is full. The second processor utilizes allocated buffer(s) pointer(s) accumulated in the first storage space. The second processor is to cause a DMA engine to move a bulk of two or more buffer(s) pointer(s) from the allocation ring to the first storage space, and to move a bulk of two or more buffer(s) pointer(s) from the second storage space to the de-allocation ring.

22 Claims, 5 Drawing Sheets

METHOD FOR MANAGING BUFFERS POOL AND A SYSTEM USING THE METHOD

FIELD OF THE DISCLOSURE

The present disclosure relates generally to the field of computers. More specifically, the present disclosure relates to a method for managing buffers pools.

BACKGROUND

Memory units, or elements, in which data and execution code words are stored, have long been playing a major role in computer systems. This is even more so with the ongoing increase in the number of information to be processed and the growth in the amount of, and the rate at which, data is exchanged between computer systems. A typical computer application involves insertion and retrieval of data into/from a memory of a computer. Since, in many cases, computers are required to process data at very high speeds, fast and efficient insertions/retrievals of data to/from memories are a must.

Typically, a computer system has a memory unit with fixed size, and managing the content of the memory is relatively easy if the computer system is based on a single processor, or controller. However, in many cases, computer systems include two or more processors, generally referred to as "multi processor environment", for enabling them to process, or handle, several tasks simultaneously. For example, one processor of a computer system may handle tasks relating to a display screen, whereas a second processor may handle tasks relating to multimedia data. A third processor may handle communications between the computer system and another computer system, and so on. Managing a physical memory that is shared by several processors is harder than managing a memory that is used by a single processor, because each processor has its own memory requirements. That is, each processor has to be able to store and fetch data from the shared physical memory without being interfered by, or interfering with, normal operation of other processors. A memory sharing methodology has to be applied in order to enable fast and efficient usage of a memory in a multi-processor environment.

A popular memory sharing methodology involves using a number of independent memory buffer pools while allocating the available memory space of a computer system among the memory buffer pools. Memory buffer pools may then be allocated to each processor according to its memory requirements. If a processor no longer needs (for a certain amount of time) a buffer pool allocated to it, the buffer pool may be de-allocated from it for the sake of another processor that might need it. The process of, and the considerations (or policy used) for, allocating and de-allocating memory buffer pools is generally termed "management of buffer pools". De-allocating a memory buffer pool is also termed "freeing a memory buffer pool".

The way memory buffer pools are managed greatly influences the performance of the computer system. In general, when adopting a particular memory buffers pools managing methodology, one has to factor in workload and system properties that may vary over time. Another major factor is response time, which is the time required, for example, for allocating (for or during a task being processed) a single buffer from the buffer pool or to release a buffer back to the free buffer pool. More about memory buffers pools may be found, for example, in "Autonomic Buffer Pool Configuration in PostgresSQL" by Wendy Powley et al. (School of Computing, Queen's University, Kingston, ON, Canada).

U.S. Pat. No. 6,931,497, by Clayton et al. (Aug. 16, 2005), discloses shared memory management utilizing a free list of buffers indices. U.S. Pat. No. 6,931,497 teaches "receiving a first buffer allocation command from a first processor, the allocation command including a register address associated with a pool of buffers in a shared memory, determining whether a buffer is available in the buffer pool based upon a buffer index corresponding to a free buffer, and if a buffer is determined available allocating the buffer to the first processor". The solution disclosed by U.S. Pat. No. 6,931,497 includes using a cenfralized hardware implementation of a buffer manager, and a dedicated memory is used for the buffer pools management, which resides within the buffer manager.

U.S. Pat. No. 5,432,908, by Heddes et al. (Jul. 11, 1995), discloses high speed buffer management of share memory using linked lists and plural buffer managers for processing multiple requests concurrently. U.S. Pat. No. 5,432,908 teaches a buffer control memory having as many sections for buffer-control records as buffers which is employed together with a buffer manager, which is problematic because this solution necessitates a dedicated memory and buffer manager.

In a typical computer system, the processor(s) accesses the physical memory by using a direct memory access ("DMA") engine. In general, whenever a processor needs to read (fetch) or to write (store) data from/to the physical memory, the processor forwards to the DMA engine a corresponding DMA-read or DMA-write request, whichever the case may be. If a processor issues a DMA-read request, the DMA seeks the requested data in the memory and fetches a copy thereof to the requesting processor. Likewise, if a processor issues a DMA-write request, the DMA seeks a free space in the memory and stores the data in the free space. However, using a DMA engine is costly in terms of processing time because a DMA request typically consumes several clock cycles. Therefore, an aspect of "good" management of memory buffer pools is associated with reducing the number of DMA requests that are issued by the processor(s).

SUMMARY

The following embodiments and aspects thereof are described and illustrated in conjunction with systems, tools and methods, which are meant to be exemplary and illustrative, not limiting in scope. In various embodiments, one or more of the above-described problems have been reduced or eliminated, while other embodiments are directed to other advantages or improvements.

As part of the present disclosure a multi processor data processing system is provided, which includes a first processor (HOST processor) functionally coupled to a general (usually the system's) memory having allocation ring and de-allocation ring portions for allocating and de-allocating buffer(s) pointer(s), respectively, and a second (network) processor having an internal storage array logically divided into first storage space and second storage space. The first storage space may be used for holding buffer(s) pointer(s) allocated for (and optionally buffer(s) pointer(s) released by) the second processor, and the second storage space may used for holding buffer(s) pointer(s) de-allocated by the second processor.

According to some embodiments of the present disclosure the second processor may be adapted to cause a direct memory access (DMA) engine to move a bulk of buffer(s) pointer(s) from the allocation ring to the first storage space (IN_CACHE) responsive to excessive usage of (or consuming all the) buffers by the second processor, and a bulk of buffer(s) pointer(s) from the second storage space (OUT_CACE) to the de-allocation ring responsive to excessive de-allocation (releasing) of buffers by the second processor. A logic boundary may divide the first storage space into the first storage part, for holding for use one or more allocated buffer(s) pointer(s), and a second storage part, for holding in standby one or more buffer(s) pointer(s) moved (using the DMA) from the allocation ring to the second processor. The second processor may utilize allocated buffer(s) pointer(s) stored in the first storage part or temporarily release unrequired buffer(s) pointer(s) to the first storage part, or, if it is full, to the second storage space.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. It is intended that the embodiments and figures disclosed herein be considered illustrative, rather than restrictive. The disclosure, however, both as to organization and method of operation, together with objects, features, and advantages thereof, may best be understood by reference to the following detailed description when read with the accompanying figures, in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

In the following detailed description, numerous specific details are set forth in order to provide a thorough understanding of the disclosure. However, it will be understood by those skilled in the art that the present disclosure may be practiced without these specific details. In other instances, well-known methods, procedures, components and circuits have not been described in detail so as not to obscure the present disclosure.

Unless specifically stated otherwise, as apparent from the following discussions, it is appreciated that throughout the specification terms such as "processing", "computing", "calculating", "determining", or the like, refer to the action and/or processes which may be performed by or on a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

The disclosure may take the form of an entirely hardware embodiment, an entirely software embodiment or an embodiment containing both hardware and software elements. In a preferred embodiment, the disclosure is implemented in software, which includes but is not limited to firmware, resident software, microcode, or the like, which may be processed on a microprocessor or microcontroller.

Embodiments of the present disclosure may include apparatuses for performing the operations described herein. This apparatus may be specially constructed for the desired purposes, or it may comprise a general purpose computer selectively activated or reconfigured by a computer program stored in the computer.

Furthermore, the disclosure may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium or the like. Examples of a computer-readable medium include a semiconductor or solid state memory, magnetic tape, magnetic-optical disks, a removable computer diskette, a random access memory (RAM), a read-only memory (ROM), a rigid magnetic disk, an optical disk, electrically programmable read-only memories (EPROMs), electrically erasable and programmable read only memories (EEPROMs), magnetic or optical cards, or any other type of media suitable for storing electronic instructions, and capable of being coupled to a computer system bus.

Figure 1:
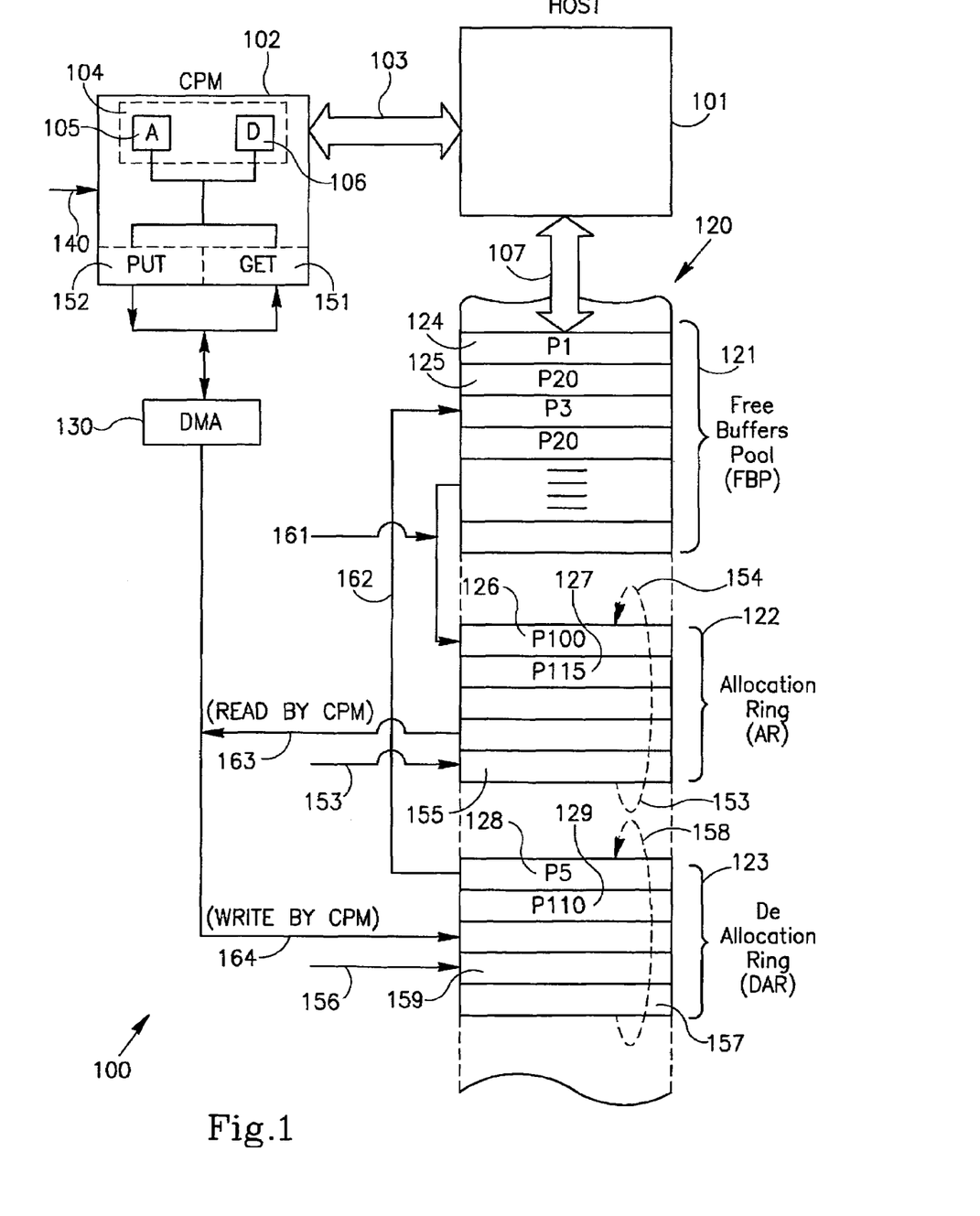
FIG. 1 schematically illustrates a general layout and functionality of a system according to some embodiments of the present disclosure.

Referring now to FIG. 1, a general layout and functionality of a memory buffers pool management system (generally shown at 100) is schematically illustrtated. Memory buffers pool management system 100 is a multi processor environment because it includes, according to this example, a first (control) processor (HOST) 101 and a second (network) processor (CPM) 102. HOST 101 (the first processor) and CPM 102 (the second processor) may exchange data over data bus 103. In some embodiments, an additional CPM similar to CPM 102 may coexist with HOST 101.

In order to eschew lengthy DMA latency times, CPM 102 (the second processor) may maintain and manage several cache memory areas from/to which CPM 102 may try to allocate or free (release) buffers, if possible; that is, to allocate buffer(s) if there is a buffer pointer available in the cache, and to release buffer(s) if there is space available in the cache to accommodate the released buffer pointer(s). These cache areas are intended to temporarily hold buffer(s) pointer(s) pre-fetched from allocation ring (AR) 122 (for example) or to serve as an intermediator storage area for buffer(s) pointer(s) that are about to be returned to de-allocation (DAR) 123, through DMA 130 (for example). By first accumulating buffers' pointers in these cache areas and then DMA'ing bulk buffers' pointers, CPM 102 may both reduce the number of DMA operations (requests) and eschew DMA waits. Using cache memory areas, as disclosed herein, has another advantage: CPM 102 may perform buffers allocation and buffers de-allocation substantially without interruptions, while DMA 130 may be reading or writing a bulk of handles. Put differently, the internal process (the process occurring inside CPM 102) of buffers allocation and buffers de-allocation and the external process (the process occurring outside CPM 102) of buffers allocation and buffers de-allocation may coexist without having a first process (for example the internal process) interfering with the other (the external) process. Yet another advantage is that during periods when the demand rate for buffers on the CPM 102 is of the same order as the release rate of buffers, buffers allocations and buffers de-allocations demands will be satisfied very efficiently using the cache memory inside CPM 102, and without using DMA 130 at all. Accordingly, CPM 102 may include a local (an internal) memory (storage array) (shown at 104) that may include two distinct areas: a first storage space (a buffer allocation (A) area, shown at 105), called hereinafter an allocation cache or IN_CACHE and a second storage array (buffer de-allocation (D) area, shown at 106), called hereinafter de-allocation cache or OUT_CACHE.

Memory buffers pool management system 100 may also include a general memory (generally shown at 120), also sometimes called hereinafter the system's memory. HOST 101 may directly read data from and write data to (shown at 107) system memory 120. According to some embodiments of the present disclosure, a first memory area, or portion, (shown at 121) of system memory 120, hereinafeter referred to as Free Buffers Pool ("FBP"), may be dedicated to, or reserved for, buffer(s) pointer(s) associated with a free buffers pool; a second memory area, or portion, (shown at 122) of system memory 120, hereinafeter referred to as Allocation Ring ("AR"), may be dedicated to, or reserved for, buffer(s) pointer(s) associated with allocation of buffers to CPM 102; and a third memory area, or portion, (shown at 123) of system memory 120, hereinafter referred to as De-Allocation Ring ("DAR"), may be dedicated to, or reserved for, buffer(s) pointer(s) associated with de-allocation of memory buffers that are no longer used, or required, by CPM 102, at least not currently.

Host 101 may keep an external pointers accounting ("EPA"), which means that whenever the number of pointers contained in AR 122 gets below some threshold level, because CPM 102 already fetched many pointers from AR 122, Host 101 may cause additional pointers to be moved (shown at 161) from FBP 121, which is the primary pointers reservoir in the system, to AR 122, which is a secondary reservoir in the system for pointers that are yet to be allocated for CPM 102 (that is, should the need arise). In addition, Host 101 may cause de-allocated pointers (pointers that were released by CPM 102) to be moved (shown at 162) from DAR 123 to FBP 121. By "external pointers accounting" is meant external to CPM 102, as CPM 102 maintains an internal pointers accounting, as is fully described in connection with FIGS. 2 through 4.

System memory 120 may include, in addition to memory portions FBP 121, AR 122 and DAR 123, other memory areas (hereinafter collectively called data area, not shown), which may consist of empty and non-empty entries (entries that contain some data). According to some embodiments of the present disclosure, FBP 121, AR 122 and DAR 123 may each contain a plurality of pointers, each of which may point at a different entry of the data area in system memory 120. For example, pointer P1 stored in entry 124 of FBP 121 may point at a first entry of the data area (not shown), whereas pointer P20 in entry 125 of FBP 121 may point at another entry of the data area (not shown). Likewise, pointer P100 stored in entry 126 of AR 122 may point at a third entry of the data area (not shown) and pointer P115 in entry 127 of AR 122 may point at still another entry of the data area (not shown). Likewise, pointer P5 stored in entry 128 of DAR 123 may point at yet another entry of the data area (not shown) and pointer P110 in entry 129 of DAR 123 may point at still another entry of the data area (not shown).

In general, HOST 101 and CPM 102 manage the content of, or the pointers in, the entries of FBP 121, AR 122 and DAR 123, as described hereinafter, to allocate memory buffers to CPM 102, and to de-allocate (free or release) therefrom memory buffers, according to actual needs of CPM 102.

Being a network processor, a task of CPM 102 is to receive (generally shown at 140) data from other devices over a data communication network, such as a packet switched network ("PSN") and the like. CPM 102 may receive data in the form of data packets (for example). After receiving a data packet (shown at 140) from the PSN (not shown), CPM 102 temporarily stores and processes the packet and then sends the packet as is, or (depending on the type of the packet) a modified version thereof to the PSN.

As part of an initialization step, HOST 101 may allocate for CPM 102 some memory buffers. By "allocate" is meant storing in IN_CACHE 105 at least one pointer that points at a specific memory buffer. Therefore, CPM 102 may choose a pointer (the pointer, if there is only one pointer in TN_CACHE 105) to point at a memory buffer/space in which CPM 102 may temporarily store the received data packet (shown at 140). Once the packet has been processed and sent to the PSN (not shown) by CPM 102, CPM 102 may de-allocate (release) the memory buffer by inserting the (now unused, released or unrequired) buffer(s) pointer into IN_CACHE 105, or to OUT_CACHE 106 if IN_CACHE 105 is full. Pointers released into OUT_CACHE 106 will be forwarded (moved or returned) by DMA 130 to DAR 123, as is more fully described in connection with FIGS. 2 through 4. Unlike HOST 101, CPM 102 cannot directly read (shown at 163) data (fetch pointers) from AR 122, nor can it directly write (shown at 164) data (release pointers) to DAR 123, but, rather, it can read from AR 122 and write to DAR 123 only through DMA 130, by utilizing a GET pointer (get_ptr) (shown at 151) to indicate to DMA 130 the location in AR 122 from which a requested pointers bulk can be obtained, and a PUT pointer (put_ptr) (shown at 152) to indicate to DMA 130 the location in DAR 123 to which released pointers can be moved. As an example, get_ptr 151 is shown pointing (at 153) at an entry 155 in AR 122, and put_ptr 152 is shown pointing (at 156) at an entry 159 of DAR 123.

Figure 2:
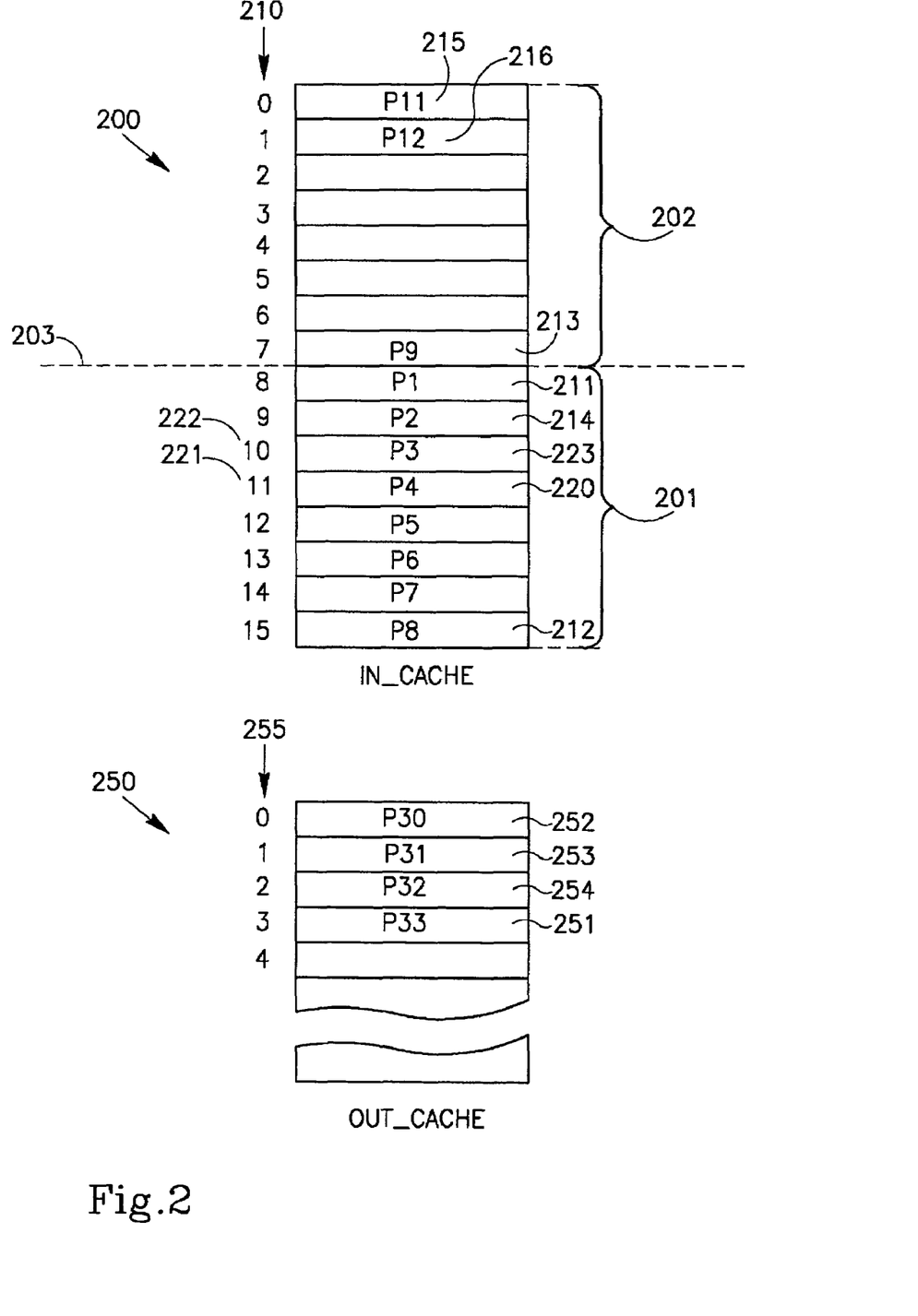
FIG. 2 schematically illustrates exemplary cache memory organization according to some embodiments of the present disclosure.

Referring now to FIG. 2, an exemplary IN_CACHE space (a first storage space) and OUT_CACHE space (a second storage space) are schematically shown. IN_CACHE 200 and OUT_CACHE 250 may be similar to IN_CACHE 105 and OUT_CACHE 106, respectively, of FIG. 1, and their functionality will be described in association with FIG. 1. CPM 102 may utilize IN_CACHE 200 and OUT_CACHE 250 to perform an internal pointers accounting. Performing an internal pointers accounting by CPM 102 means that, so long as demand (by CPM 102) for pointers is substantially steady, CPM 102 takes pointers from, releases currently unrequired pointers to and reuses temporarily released pointers that are all contained within cache memory 104 (CPM 102 internal storage array). IN_CACHE 200 and OUT_CACHE 250 facilitate the internal pointers accounting in the way described hereinafter. However, if the internal pointers account gets out of balance, which situation may occur when IN_CACHE 200 can no longer provide CPM 102 with required pointers or when CPM 102 releases too many pointers, then CPM 102 may refresh IN_CACHE 200 and OUT_CACHE 250 by causing DMA 130 to fetch additional pointers from AR 122 to IN_CACHE 200 or to move pointers from OUT_CACHE 250 to DAR 123, whichever the case may be.

According to some embodiments of the present disclosure IN_CACHE 200 may be used for both pointer(s)/buffer(s) allocation and pointers/buffer(s) de-allocation (buffer(s) releasing). OUT_CACHE 250 may be used as a second layer cache area in which empty data buffers pointers, which cannot be returned to IN_CACHE 200 (due to lacking space in IN_CACHE 200), wait until they can be sent, through DMA 130, back to DAR 123. IN_CACHE 200 is typically used by CPM 102 more frequently than OUT_CACHE 250 because CPM 102 utilizes allocated buffer pointers in IN_CACHE 200 for its normal operation, which typically includes receiving, processing and transmitting packets, whereas OUT_CACHE 250 is only utilized by CPM 102 once in a while, for returning (de-allocating) unused, or unrequited, buffer(s) pointer(s) to DAR 123 in system memory 120.

CPM 102 (the second processor) may be adapted to cause DMA 130 (shown at FIG. 1) to move a bulk of buffer(s) pointer(s) from AR 122 (shown at FIG. 1) to IN_CACHE 200 (the first storage space) responsive to excessive usage of buffers by CPM 102, and a bulk of buffer(s) pointer(s) from OUT_CACHE 250 (the second storage space) to de-allocation ring DAR 123 (shown at FIG. 1) responsive to excessive de-allocation of buffers by CPM 102 (shown at FIG. 1).

According to some embodiments of the present disclosure IN_CACHE 200 may contain up to 16 pointers, indexed 0 through 15 (shown as cache index 210), including pointers associated with (allocated) data buffers used by CPM 102, and pointers associated with data buffers which are not used (de-allocated) by CPM 102. That is, whenever a new empty data buffer is to be allocated to CPM 102, a pointer to that data buffer may be taken from IN_CACHE 200 and whenever a data buffer is no longer used by CPM 102, that data buffer is de-allocated by CPM 102 by returning the pointer associated with that data buffer to IN_CACHE 200 for later use, assuming that there is space for that pointer in IN_CACHE 200. IN_CACHE 200 may periodically, or at times, become depleted of data buffers and, in such cases, a new batch of empty data buffers may have to be allocated to CPM 102, by forwarding to IN_CACHE 200 (through DMA 130) a corresponding set of pointers from AR 122.

In order to allow CPM 102 to normally operate without interuptions while DMA 130 writes new data buffer(s) pointer(s) to IN_CACHE 200 IN_CACHE 200 (the first storage space in the internal storage array 104) may be logically divided, about or in respect of a logic boundary 203, into two, substantially independent, storage parts: a first storage part (shown at 201) and a second storage part (shown at 202). First storage part 201 may sometimes be used for, or be engaged in, normal CPM operations (and therefore will be called a "CPM part"), whereas second storage part 202 of IN_CACHE 200 may be used (during times when first storage part 201 is used as a CPM part) for, or may be engaged in, DMA operations (and therefore will be called a "DMA part"). The first and second storage parts are preferably equal in size so that DMA operation(s) will be substantially similar regardless of whichever part in IN_CACHE 200 (the first storage space) is used, at any given time, as a DMA part. This way, DMA operation(s) will be more efficient. Though the first and second storage parts may be initially set as CPM part and DMA part, respectively, the roles of the two parts (for example of CPM part 201 and DMA part 202) of IN_CACHE 200 may change at other times, as is explained hereinafter. CPM 102 may independently utilize the CPM part (the part currently dedicated to CPM operations, for example part 201) and the DMA part (the part currently dedicated to DMA operations, for example part 202).

As is explained earlier, IN_CACHE 200 may periodically, or at times, become depleted of data buffer(s) pointer(s) and, in such cases, a new batch of empty data buffer(s) pointer(s) may have to be allocated to CPM 102. By "become depleted of data buffer(s) pointer(s)" is meant using (by CPM 102) more than the pointers (8 pointers in this example) contained in CPM part 201. For example, it is assumed that CPM 102 has consumed pointers P1 (shown at 211) through P8 (shown at 212) which reside within the dedicated, or allowed, cache part (CPM part 201), and that CPM 102 has started using pointers from the other cache part (DMA part 202), for example pointer P9 (shown at 213). When pointers in DMA part 202 are started to be used by CPM 102, it may be said that the logic boundary (shown at 203) between DMA part 202 and CPM part 201 has been crossed, or violated.

When the logical boundary (shown at 203) is crossed, and assuming that the previously, or last, issued DMA read operation (which reads pointers stored in AR 122 to IN_CACHE 200) has completed, DMA part 202 and CPM part 201 change roles: part 201 of IN_CACHE 200 becomes dedicated now to DMA operations (rather than to CPM operations), until another boundary crossing occurs, and part 202 of IN_CACHE 200 becomes dedicated now to CPM operations (rather than to DMA operations), until another boundary crossing occurs. Once a change of roles occurs, CPM 102 may request a new DMA operation (for fetching a new set of pointers), which will result in the newly fetched pointers being stored in the newly dedicated DMA part 201, previously the CPM part 201. During a data buffer release (de-allocation), the pointer associated with the released data buffer may be released (inserted) into the currently active CPM part of IN_CACHE 200 if there is space for it. However, if there is no space available in the currently active CPM part of IN_CACHE 200, the pointer (for example pointer P33, shown at 251) may be temporarily stored in OUT_CACHE 250, which may contain other pointers (for example pointers P30, shown at 252, P31, shown at 253, and P32, shown at 254) that are not expected (at least not in the near future) to be used by CPM 102 and, therefore, these pointers (P30 through P33) can be returned to DAR 123. CPM 102 may move to DAR 123 (through DMA 130) a predetermined number of pointers at a time. For example, CPM 102 may move two pointers at a time from OUT_CACHE 250 to DAR 123, whereby to facilitate the reduction of DMA operations number. Regarding roles changes, the assumption that the previously, or last, issued DMA read operation (which reads pointers stored in AR 122 to IN_CACHE 200) has completed is generally based on the system's overall timing aspects: allocating 8 buffers usually takes time that is long enough to enable the DMA to complete the reading of the next 8 pointers. A special signature can be written to a DMA area before issuing DMA read operation(s) and checked before switching roles to ensure that DMA operation(s) are completed.

It is noted that if logical boundary 203 is never crossed in the sense explained earlier (which is only theoretical), it means that CPM 102 does not require pointers other than the limited group of pointers already residing within the CPM part (for example CPM part 201) in IN_CACHE 200. In other words it means that CPM 102 may (theoretically) continue to use the same limited group of pointers by allocating pointers from that group, and if some pointers were de-allocated, by reallocating them. In such a case, CPM 102 may use different pointers in the CPM part (for example pointers P1 (shown at 211) and P2 (shown at 214) in CPM part 201) and return (de-allocate) other pointers to the CPM part. As is explained earlier, if CPM 102 wants to de-allocate a pointer but the CPM part is full, CPM 102 may instead return the de-allocated pointer to the OUT_CACHE.

Figure 3A:
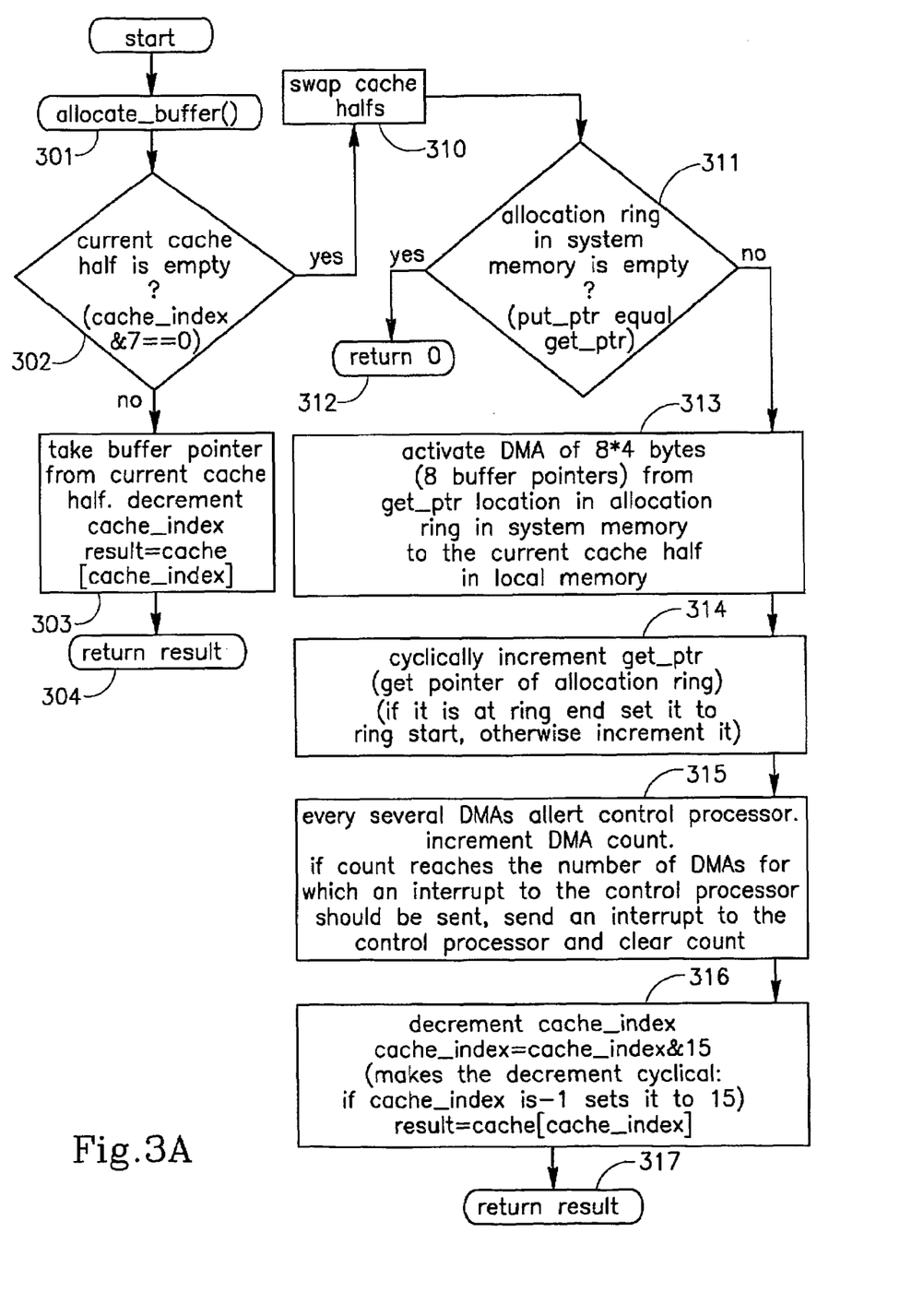
FIG. 3A is a flow chart describing how pointers may be allocated for a CPM such as CPM 102 of FIG. 1.
Figure 3B:
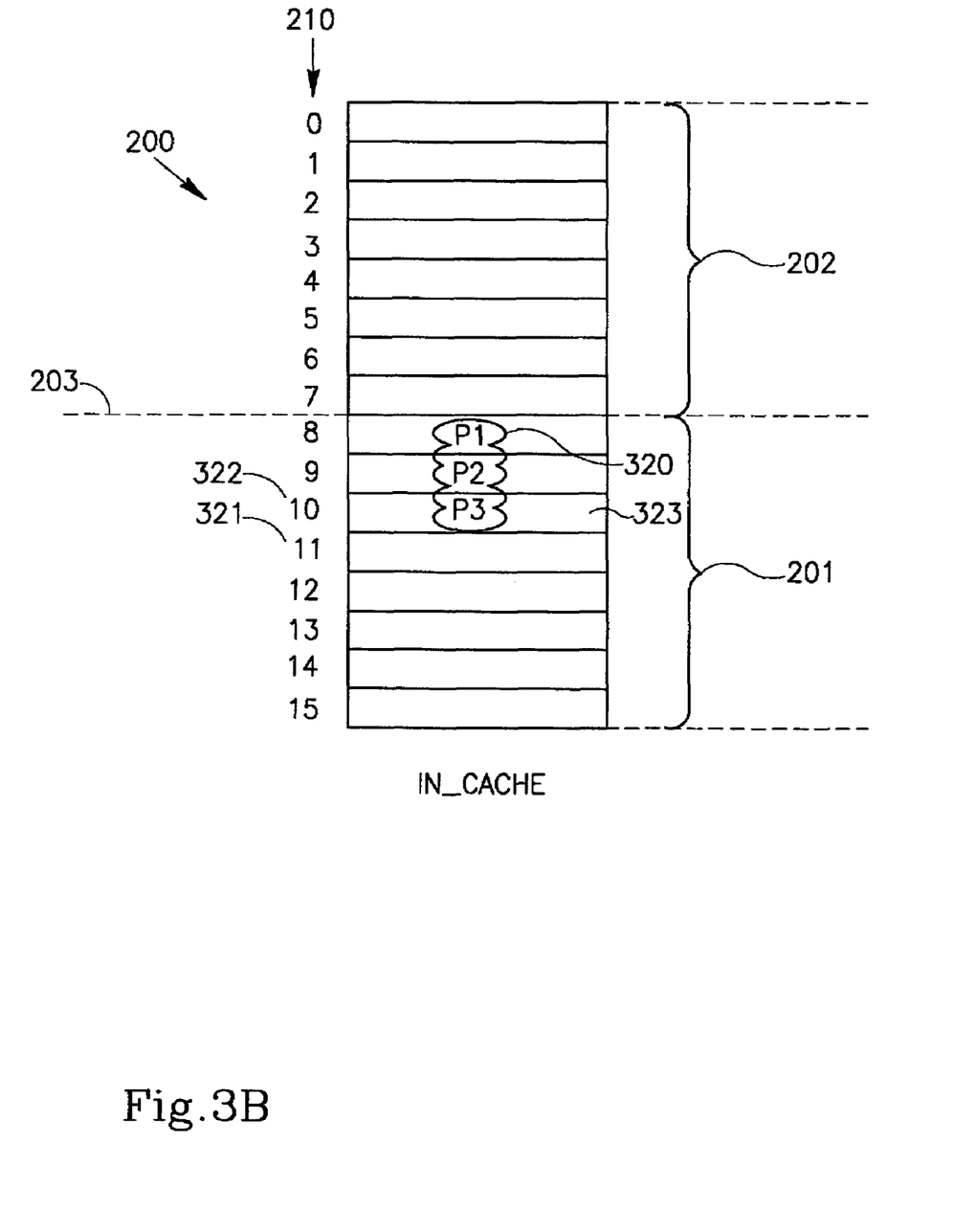
FIG. 3B schematically illustrates a first storage space (IN_CACHE) having an exemplary content.

FIG. 3A is a flow chart showing an exemplary method of how pointers may be allocated for a CPM such as CPM 102 of FIG. 1. FIG. 3B shows IN_CACHE 200 of FIG. 2, but with a different exemplary content. FIG. 3A will be now described in association with FIGS. 1 and 3B. When CPM 102 needs a pointer to a free buffer, allocate_buffer routine is called (shown at 301). If the CPM part 201 is not empty (shown as No at step 302), it means that CPM part 201 includes at least one more pointer that CPM 102 can use. Exemplary IN_CACHE 200 is shown in FIG. 3B containing three more pointers (P1, P2 and P3, collectively designated as 320) that can be used by CPM 102. Accordingly, at step 303, the pointer to be used by CPM 102 may be found, or obtained, by decrementing cache index 210 (cache index) and extracting the pointer residing within the entry associated with the decremented cache index. Referring again to FIG. 3B, if the current value of the cache_index is 11 (shown at 321), then, in accordance with step 303, the cache_index is decremented and the resulting cache_index value (10 in this example) points at, or is associated with (shown at 322) pointer P3 (shown at 323), which is returned (at step 304) as the resulting next pointer that will be used by CPM 102.

If, however, CPM part 201 is empty (shown as Yes at step 302), it means that CPM 102 already depleted, or exhausted, all of the pointers resources allocated for it in the current CPM part (part 201 for example) and, therefore, new pointers have to be fetched, or imported, from AR 122. In order to facilitate the fetching of new pointers to IN_CACHE 200, CPM 102 swaps, at step 310, between CPM part 201 and DMA part 202, which means that CPM part 201 and DMA part 202 change roles: CPM part 201, which was found empty (shown as Yes at step 302) and therefore failed to provide another pointer to CPM 102, will be dedicated now to DMA operations (and therefore it may be called, until the next swap, DMA part 201), and DMA part 202, which can provide at least one pointer to CPM 102, will be dedicated now to CPM operations (and therefore it may be called, until the next swap, CPM part 202).

Swapping between CPM part 201 and DMA part 202 makes room in IN_CACHE 200 for new pointers and, therefore, at step 311, it is checked whether new pointers can be fetched from the allocation ring (AR) 122. If the allocation ring (AR 122) in the system memory is empty (shown as Yes at step 311), routine allocate_buffer returns a zero value (at step 312). However, if the allocation ring in the system memory is not empty (shown as No at step 311), then, in accordance with step 313 CPM 102 requests DMA 130 to fetch from the allocation ring (from AR 122, for example) eight 4 byte blocks (a total of 32 bytes block), for example, where each pointer has a size of 4 bytes. A GET pointer (shown as GET 151 in FIG. 1 and as "get_ptr" at step 313) may be used to point at the relevant 32-byte block for allowing DMA 130 to fetch and to forward them to the part in IN_CACHE 200 which is currently used (that is, after performing the swap at step 310) as the DMA part.

After DMA 130 forwards (at step 313) the 32 bytes block associated with new pointers to the DMA part in IN_CACHE 200, get_ptr (which points to the current bulk, or block, of pointers in Allocation Ring 122) may be cyclically incremented, at step 314, for getting ready to fetch (for IN_CACHE 200) additional (the next) 32 bytes that are associated with the next available pointers bulk. By "cyclically incremented" is meant monotonically incrementing the value of get_ptr 153 until it points at the last entry (shown at 155) of AR 122, after which (when the next increment is to occur) get_ptr 153 will be set to point (shown at 154) at the first entry (shown at 126) of AR 122.

It is assumed that, while CPM 102 allocates (draws) buffer(s) pointer(s) from AR 122 (using DMA 130), control processor (HOST 101) replenishes AR 122 so that AR 122 will not run out of buffer pointers. Valid buffer pointers may reside in a single contiguous area in AR 122, which area may be cyclic; that is, this area might begin at one location in AR 122, then it may reach the physical end of AR 122 and, thereafter, continue from the physical beginning of the AR 122.

DMA 130 may be requested several times by CPM 102 to fetch pointers bulks, which may result in a shortage of available pointers bulks in AR 122. In order to ensure that there will be substantially always available pointers bulks in AR 122 for CPM 102, a DMA count may be used to alert HOST 101 that a certain predetermined number of pointers bulks are already used by CPM 102. That is, according to some embodiments of the present disclosure CPM 102 may increment (at step 315) the value of DMA count every time CPM 102 requests DMA 130 to fetch a pointers bulk. When the value of the DMA count reaches a predetermined value (for example when the DMA count equals 5), CPM 102 may generate and forward an interrupt (an allocation) signal to HOST 101 and, thereafter (or concurrently), set DMA count to zero value. Responsive to, or based on, the allocation signal forwarded to it from CPM 102, HOST 101 may decide whether it (HOST 101) should move pointers bulks from the free buffer pool 121 to AR 122, to allow AR 122 to cope with future demand(s) (by CPM 102) for buffer(s) pointer(s).

It is assumed that after step 313 is performed the DMA operation will be completed before the eight buffers pointers in the CPM part of IN_CACHE 200 are used by CPM 102, and the two cache parts are swapped again. At step 316, the cache_index (generally shown at 210) is cyclically decremented, and the pointer residing in, or associated with, the decremented value (the resulting pointer, or the result at step 316) is returned, at step 317, as the next pointer that will be utilized by CPM 102 to point at a corresponding memory space within system memory 120 that will serve as data buffers.

Figure 4:
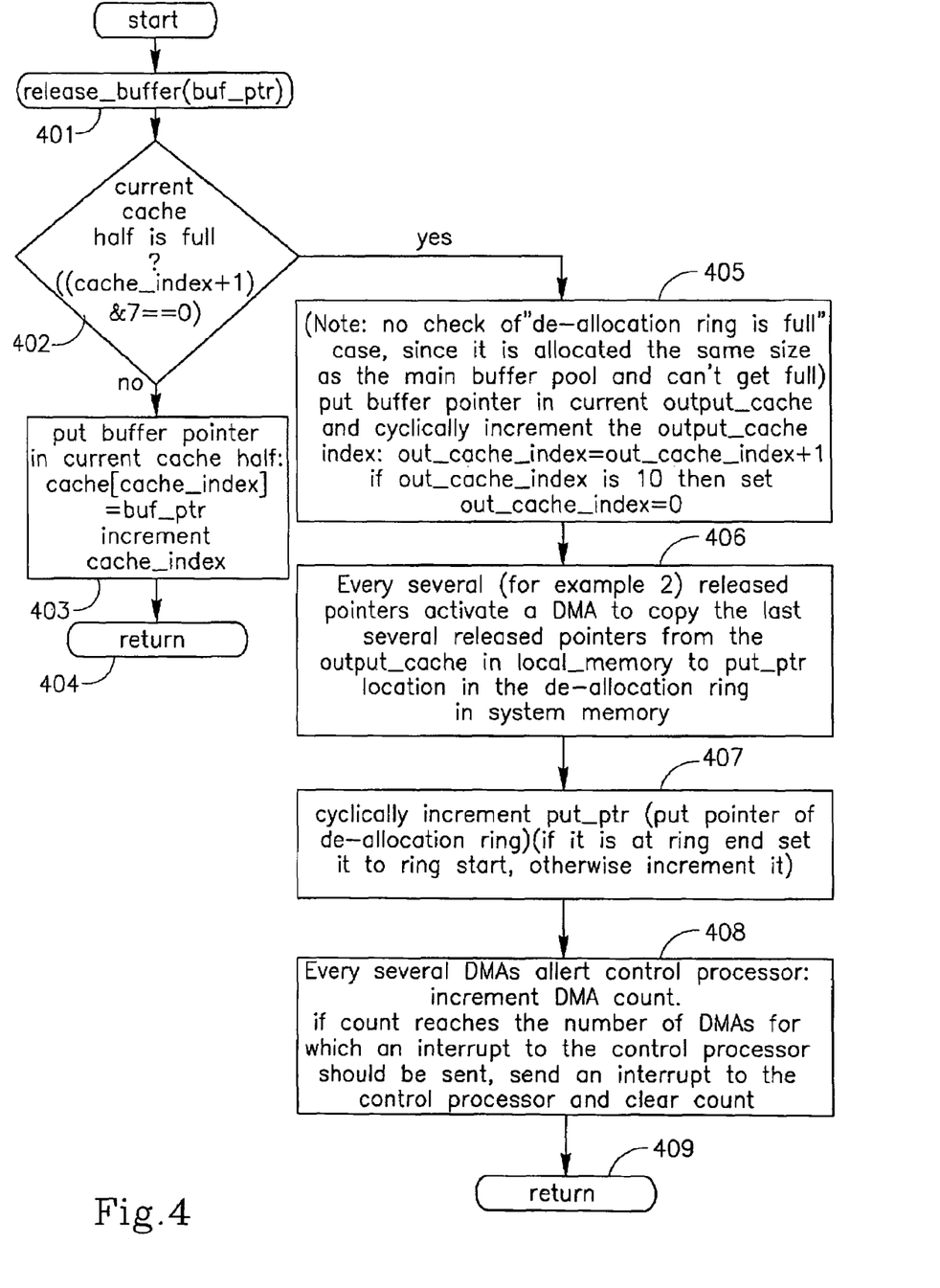
FIG. 4 is a flow chart describing how pointers may be de-allocated (released) from a CPM such as CPM 102 of FIG. 1.

FIG. 4 is a flow chart showing an exemplary method of how pointers may be de-allocated (released) from a CPM such as CPM 102 of FIG. 1. FIG. 4 will be described in association with FIGS. 1 and 2. If CPM 102 does not require any more a memory space in system memory 120, CPM 102 may call (shown at 401) a procedure called release_buffer for deallocating the pointer(s) associated with the unrequired memory space (buffers). In order to deallocate a pointer that is not currently required by CPM 102, it is first checked whether the unrequired pointer can be put in the CPM part (for example CPM part 201) IN_CACHE 200, and, as is explained earlier, an unrequited pointer can be put in CPM part 201 (in this example) if CPM part 201 is not full (shown as No at step 402. Regarding the expression ((cache_index+1)&7=0) used at step 402, '&' designates bitwise (logic) AND. Further, cache_index can have values 0, 1, 2, . . . , 15. For values 0 and 8, after incrementing the cache_index the logic boundary between the two cache parts (the CPM part and the DMA part) is about to be crossed. Therefore, the expression '((cache_index+1)&7=0)' checks whether the expected value of the cache_index (after it is incremented) is going to be either 0 or 8 (in which cases the 3 least significant bits will be 0). If the expected value of the cache_index (after it is incremented) is expected to be 0 or 8, it means that the logic boundary is about to be crossed. The expression checks for values of 8 and 16. A value of 16 will become zero during the actual increment.

At step 403 a buffer pointer buf_ptr, which is the pointer pointing at the buffer to be (released) deallocated by CPM 102, is put in an entry in the current CPM part (in this example in CPM part 201) which is addressed by the current value of cache_index. Still at step 403, after, or concurrently with, putting the deallocated pointer in CPM part 201, the value of cache_index is incremented in preparation for storing in CPM part 201 the next unrequired pointer (if there will be such a pointer).

Referring again to FIG. 2, if the last (current) value of cache_index is, for example, 10 (shown at 222), then, in accordance with step 403, the deallocated pointer is stored in entry 223 and cache_index is incremented to equal 11 (shown at 221). After putting the pointer in CPM part 201 and incrementing cache_index, control may return (shown at 404) to the calling application.

If, however, the current CPM part (CPM part 201, for example) is full (shown as Yes at 402), it means that the deallocated pointer cannot be stored in IN_CACHE 200 because there is no available space in CPM part 201 for the deallocated pointer. In addition, the DMA part of IN_CACHE 200 (DMA part 202 in this example) is dedicated to pointers that are fetched from AR 122 by DMA 130 and, therefore, DMA part 202 is not intended to store deallocated pointers. Therefore, at step 405, the deallocated pointer is put in the OUT_CACHE 250 and the OUT_CACHE_(generally shown at 255) is cyclically incremented. OUT_CACHE_index points at the next free place in OUT_CACHE 250 (shown in FIG. 2) and it is a cyclic pointer, which means that when OUT_CACHE_reaches the last value 9, the (next) value after incrementing OUT_CACHE_will be 0 instead of 10. Each time OUT_CACHE_becomes even, the DMA engine is activated to move the last two pointers, which were put thus far in OUT_CACHE 250, into DAR 123. If, after being incremented, the value of OUT_CACHE index equals to 10 (for example), then OUT_CACHE_is initialized, such as by setting its value to zero. It is noted that although deallocated (released) pointers are intended to return to DAR 123 in system memory 120, there is no need to check whether DAR 123 has room for the released pointers, because DAR 123 is substantially as large as the free buffers pool (FBP 121) and, therefore, DAR 123 cannot be full.

At step 406 CPM 102 instructs DMA 130 to move pointers already stored in OUT CACHE 250 to DAR 123. CPM 102 may forward to DMA 130 a move instruction (to perform a write operation) every time OUT_CACHE 250 contains a predetermined number of released (de-allocated) pointers. For example, CPM 102 may forward to DMA 130 a move instruction every time OUT_CACHE 250 contains two released pointers. Released pointers, which temporarily reside in OUT_CACHE 250, may be moved (by DMA 130) to available place(s) in DAR 123, which are pointed at by a PUT pointer (put_ptr or PUT, as shown at 152 in FIG. 1). Put_ptr 156 is shown at 156 pointing at an exemplary empty space (entry) in DAR 123.

The value of put_ptr 156 may be cyclically incremented, at step 407, for getting ready to move additional released pointers (from OUT_CACHE 250 to DAR 123). By "cyclically incremented" is meant monotonically incrementing the value of put_ptr 156 until it points at the last entry (shown at 157) of DAR 123, after which (when the next increment is to occur) put_ptr 156 will be set to point (shown at 158) at the first entry (shown at 128) of DAR 123. Put_ptr 156 is allowed to cyclically return to the first entry 128 because DAR 123 can contain all buffer pointers in the system, so that it cannot get full, and the next location in DAR 123 is always free of buffer(s) pointer(s).

DMA 130 may be requested several times by CPM 102 to move buffer pointers from OUT_CACHE 250 to DAR 123. If the content of DAR 123 is not properly handled, there might be a situation where too many buffers pointers accumulate in DAR 123, which may cause HOST 101 CPU to starve for buffers pointers. In order to eschew the latter problem a DMA count may be used to alert HOST 101 that a certain predetermined number of released pointers were moved (by DMA 130) back to DAR 123. That is, according to some embodiments of the present disclosure CPM 102 may increment (at step 408) the value of the DMA count every time a bulk of released pointers is/was moved by DMA 130 to DAR 123. When the value of the DMA count reaches a predetermined value (for example when the DMA count equals 5), CPM 102 may generate and forward an interrupt (a de-allocation) signal to HOST 101 and, thereafter (or concurrently), set the DMA count value to zero. Responsive to, or based on, the de-allocation signal forwarded to it from CPM 102, HOST 101 may decide whether it should move buffer(s) pointer(s) bulk(s) from DAR 123 to the free buffer pool (FBP) 121. At step 409 control is returned to the calling application.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A multi processor data processing system, comprising:
   a first processor functionally coupled to a general memory having allocation ring and de-allocation ring portions for allocating and de-allocating buffer(s) pointer(s), respectively; and
   a second processor to perform internal accounting of pointer(s) buffer(s), wherein the second processor has an internal storage array logically divided into:
   a first storage space for holding accumulating a plurality of buffer(s) pointer(s), which are either allocated for or released by, said second processor,
   and second storage space for accumulating two or more buffer(s) pointer(s) de-allocated by said second processor,
   wherein the second processor is adapted to release temporarily un-required buffer(s) pointer(s) to the first storage space, as long as the first storage space is not full, and to release temporarily un-required buffer(s) pointer(s) to the second storage space if the first storage space is full,
   wherein the second processor utilizes allocated buffer(s) pointer(s) accumulated in the first storage space,
   wherein said second processor is adapted to cause a direct memory access engine to move a bulk of two or more buffer(s) pointer(s) from said allocation ring to said first storage space, if the number of the buffer(s) pointer(s) accumulated by the first storage space is lesser than a first threshold and
   wherein said second processor is adapted to cause the direct memory access engine to move a bulk of two or mote buffer(s) pointer(s) from said second storage space to said de-allocation ring, if the number of the buffer(s) pointer(s) accumulated by the second storage space is greater than a second threshold.

2. The system according to claim 1, wherein the first storage space is logically divided by a logical boundary into a first storage part for accumulating one or more allocated buffer(s)

pointer(s) yet to be utilized by the second processor, and a second storage part for accumulating in standby the buffer(s) pointer(s) moved by the direct memory access engine from the allocation ring to the first storage spaced.

3. The system according to claim 2, wherein, if the first storage part does not include any allocated buffer(s) pointer(s), or if the second storage part is full, then the second processor changes the roles of the first and second storage parts such that the second storage part is to be used for accumulating the allocated buffer(s) pointer(s) yet to be utilized by the second processor, and the first storage part is to be used for accumulating the buffer(s) pointer(s) moved by the direct memory access engine from the allocation ring to the first storage space.

4. The system according to claim 1, wherein the first processor transfers to the second processor, at start up, an initial bulk(s) of buffer (s) pointer(s).

5. The system according to claim 1, wherein the general memory further comprises a free buffer(s) pool portion for holding buffer(s) pointer(s).

6. The system according to claim 5, wherein the first processor causes buffer(s) pointer(s) to be conditionally moved from the free buffer(s) pool portion to the allocation ring.

7. The system according to claim 6, wherein the condition being the allocation ring getting depleted.

8. The system according to claim 6, wherein the condition being the second processor executing a1predetermined number of direct memory access read operations.

9. The system according to claim 5, wherein the first processor causes buffer(s) pointer(s) to be conditionally moved from the de-allocation ring to the free buffer pool portion.

10. The system according to claim 9, wherein the condition is the de-allocation ring getting full.

11. The system according to claim 9,wherein the condition is the second processor executing a predetermined number of direct memory access write operations.

12. A method of managing memory buffers pool in a multi processor data system comprising a first processor functionally coupled to a general memory, and a second processor having an internal storage array, the method comprising:
  allocating, by the first processor, allocation ring portions and de-allocation ring portions in the general memory for allocating and de-allocating buffer(s) pointer(s), respectively;
  logically dividing said internal storage array into;
  a first storage space for accumulating a plurality of buffer(s) pointer(s), which are either allocated for, or released by, said second processor, and
  a second storage space. for accumulating two or more buffer(s) pointer(s) de-allocated by said second processor;
  utilizing, by the second processor, allocated buffer(s) pointer(s) accumulated in the first storage space,
  releasing buffer(s) pointer(s), which are temporarily unrequired by said second processor, to the first storage space, as a long as the first storage space is not full, and to the second storage space if the first storage space is full;
  causing a direct memory access engine to move a bulk of two or more buffer(s) pointer(s) from said allocation ring to said first storage space, if the number of the buffer(s) pointer(s) accumulated by the first storage space is lesser than a first threshold; and
  causing the direct memory access engine to move a bulk of two or more buffer(s) pointer(s) from said second storage space to said de-allocation ring, if the number of the buffer(s) pointer(s) accumulated by the second storage space is greater than a second threshold.

13. The, method according to claim 12, further comprising:
  logically dividing said first storage space, about a logic boundary, into a first storage part for accumulating one or more allocated buffer(s) pointer(s) yet to be utilized, by the second processor, and a second storage part for accumulating in standby the buffer(s) pointer(s) moved by the direct memory access engine from the allocation ring to the first storage space.

14. The method according to claim 13 comprising:
  changing the roles of the first and second storage parts, if the first storage part does not include any allocated buffer(s) pointer(s) or if the second storage part is full, such that the second storage part is to be used for accumulating the allocated buffer(s) pointer(s) yet to be utilized by the second processor, and the first storage part is to be used for accumulating the buffer(s) pointer(s) moved by the direct memory access engine from the allocation ring to the first storage space.

15. The method according to claim 12 comprising transferring, at start up, an initial bulk(s) of buffer (s) pointer(s), from the first processor to the second processor.

16. The method according to claim 12, wherein the general memory further comprises a free buffer(s) pool portion for holding buffer(s) pointer(s).

17. The method according to claim 16 comprising conditionally moving buffer(s) pointer(s) from the free buffer(s) pool portion to the allocation ring.

18. The method according to claim 17, wherein the condition being the allocation ring getting depleted.

19. The method according to claim 17, wherein the condition being the second processor executing a predetermined number of direct memory access read operations.

20. The method according to claim 16 comprising conditionally moving buffer(s) pointer(s) from the de-allocation ring to the free buffer pool portion.

21. The method according to claim 20, wherein the condition being the de-allocation ring getting full.

22. The method according to claim 20, wherein the condition is the second processor executing a predetermined number of direct memory access write operations.

* * * * *